(12) United States Patent
Kakadia et al.

(10) Patent No.: US 8,885,476 B2
(45) Date of Patent: Nov. 11, 2014

(54) TCP FLOW CONTROL OPTIMIZED FOR NETWORKS HAVING RADIO SEGMENTS

(71) Applicant: Verizon Patent and Licensing Inc., Basking Ridge, NJ (US)

(72) Inventors: Deepak Kakadia, Union City, CA (US); Jay J Lee, San Ramon, CA (US); Thomas H Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

(21) Appl. No.: 13/645,391

(22) Filed: Oct. 4, 2012

(65) Prior Publication Data

US 2014/0098668 A1  Apr. 10, 2014

(51) Int. Cl.
*H04L 12/26* (2006.01)

(52) U.S. Cl.
USPC .......................................................... 370/235

(58) Field of Classification Search
CPC .......................... H04W 28/02; H04W 28/0273
USPC ..................................... 370/235, 310; 709/219
See application file for complete search history.

(56) References Cited

U.S. PATENT DOCUMENTS

| | | | |
|---|---|---|---|
| 2003/0179720 A1* | 9/2003 | Cuny | 370/310 |
| 2011/0205899 A1* | 8/2011 | Hosein | 370/235 |
| 2012/0039169 A1* | 2/2012 | Susitaival et al. | 370/230 |
| 2013/0201997 A1* | 8/2013 | Masputra et al. | 370/417 |
| 2014/0089471 A1* | 3/2014 | Pianese et al. | 709/219 |

* cited by examiner

*Primary Examiner* — Albert T Chou

(57) ABSTRACT

Transmission Control Protocol (TCP) may be optimized for a cellular network having a radio segment. A base station may include a radio interface to connect to one or more user equipment (UE) devices and a number of queues to buffer data, incoming to the base station, from one or more servers, over TCP sessions. One or more processors may: determine state information relating to a fullness level of the queues; and transmit the state information to the one or more servers for use by the one or more servers in performing flow control with respect to the TCP sessions.

21 Claims, 8 Drawing Sheets

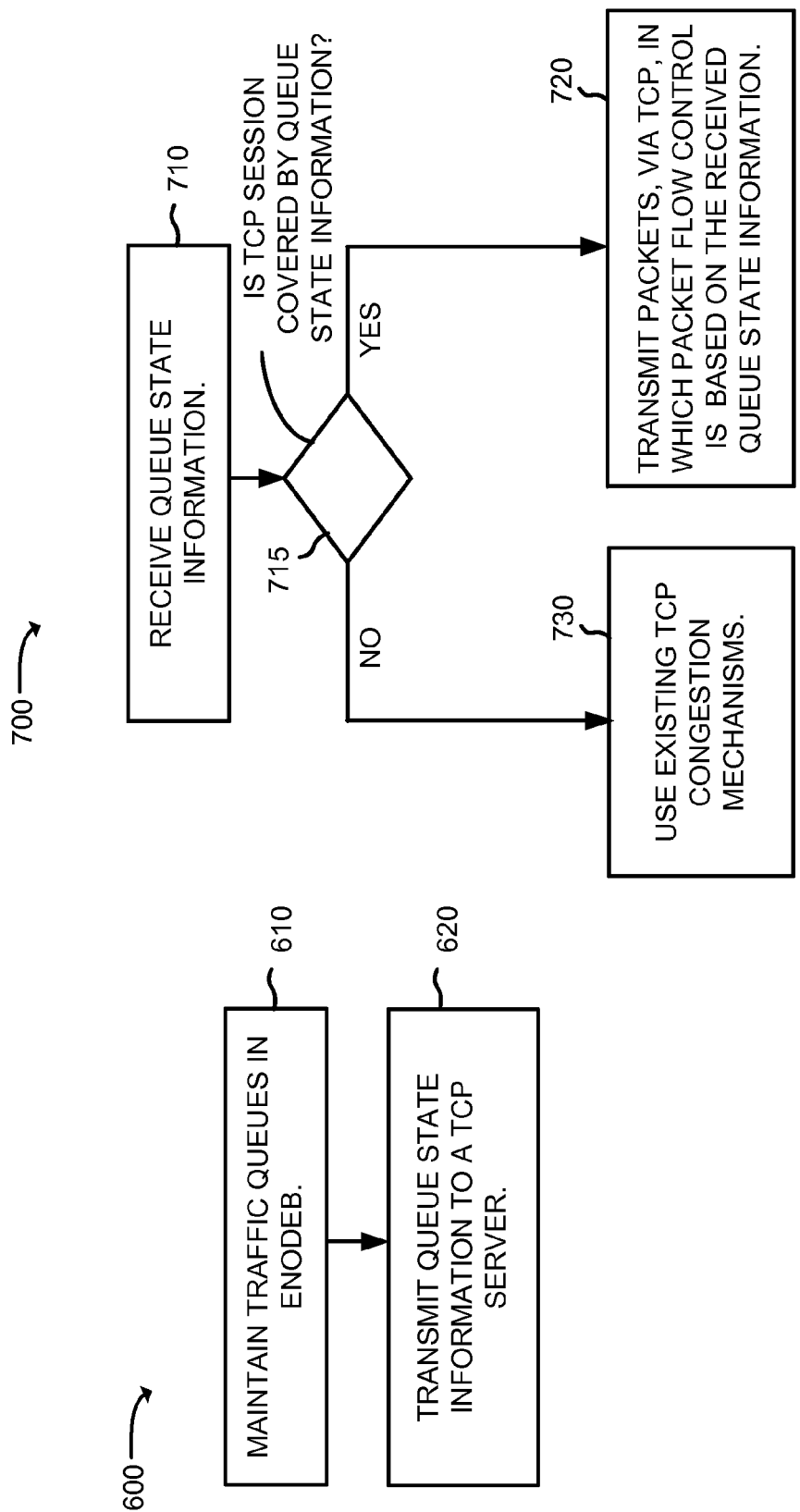

TCP FLOW CONTROL OPTIMIZED FOR NETWORKS HAVING RADIO SEGMENTS

BACKGROUND

Transmission Control Protocol (TCP) is a commonly used protocol, in the Internet Protocol (IP) suite, that provides data transmission services to application programs. For example, when an application program desires to send data, instead of breaking the data into smaller pieces and issuing a series of IP requests, the application program may issue a single request to a TCP component. The TCP component may, in turn, handle IP-related tasks associated with transmitting the data (e.g., breaking the data into smaller pieces and issuing multiple IP requests to transmit the data).

Due to network congestion, traffic load balancing, or other unpredictable network behavior, IP packets can be lost, duplicated, or delivered out of order. TCP components can detect these problems, request retransmission of lost data, and rearrange out-of-order data. Additionally, TCP components may implement congestion control algorithms to help minimize network congestion.

Existing TCP congestion control mechanisms may be designed for wireline transport, in which a varying amount of traffic is inserted into shared transport "pipes" that have a fixed bandwidth. Existing TCP congestion control mechanisms may be designed to work optimally when all traffic in the wireline transport also implements the same TCP congestion mechanisms, which collectively control how much traffic is inserted into the subject wireline transport. Existing TCP congestion mechanisms may not work, or may not work effectively or optimally, when: (1) other traffic is inserted in the same wireline transport but does not implement some form of congestion control; or (2) the capacity of the transport changes at a faster rate than at which the TCP congestion control mechanism can detect congestion and take corrective action. Situation (2) may commonly occur in certain non-wireline transport segments, such as radio transport segments.

BRIEF DESCRIPTION OF THE DRAWINGS

FIGS. 6-8 are flow charts illustrating example processes for performing TCP flow control, in accordance with some implementations described herein.

DETAILED DESCRIPTION OF PREFERRED EMBODIMENTS

The following detailed description refers to the accompanying drawings. The same reference numbers in different drawings may identify the same or similar elements.

Techniques described herein may provide for a TCP congestion control mechanism that is optimized for transport pipes that include a network segment over a radio access network (RAN). In one implementation, the TCP congestion control mechanism may be optimized for a Long Term Evolution (LTE) RAN.

In some implementations, a base station in a network (e.g., an eNodeB in an LTE network), may provide queues that are used to buffer data before sending the data to user equipment (UE), such as a mobile device, over a radio interface. The base station may provide queue state information, relating to the congestion or fullness level of the queues, to one or more servers that use TCP to transmit data to the UEs. The servers may use the queue state information when performing flow control for TCP sessions with the UEs connected to the base station. For example, the queue state information may be obtained, by a server acting as a TCP sender, before forwarding or withholding a packet. The servers, by using the queue state information when performing flow control for the TCP sessions, may optimize the TCP sessions for situations in which the transport channel for the TCP session includes a segment over a radio interface (e.g., the situation in which the UE is connected to a wireless cellular network via one or more base stations).

Figure 1A:
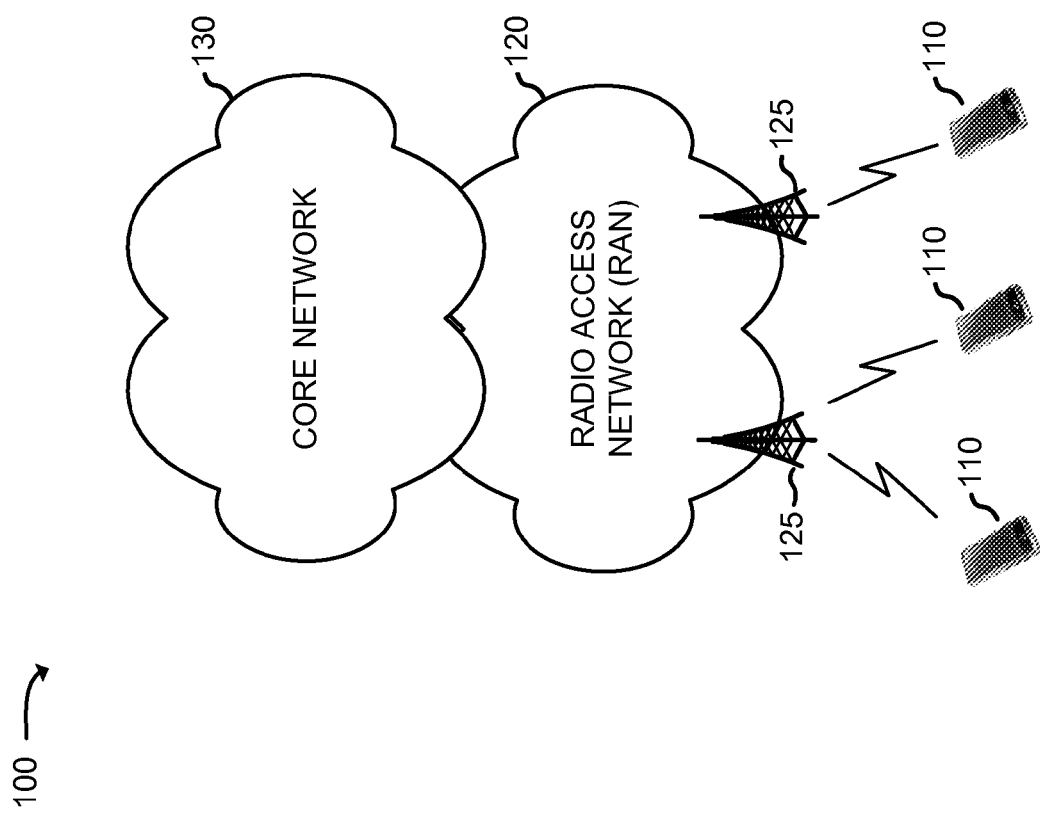
FIG. 1A is a diagram of an example environment in which systems and/or methods described herein may be implemented.

FIG. 1A is a diagram of an example environment 100 in which systems and/or methods described herein may be implemented. As illustrated, environment 100 may include one or more UEs 110, RAN 120, and a core network 130.

UEs 110 may include portable computing and communication devices, such as a personal digital assistant (PDA), a smart phone, a cellular phone, a laptop computer with connectivity to a cellular wireless network, a tablet computer, etc. UEs 110 may also include non-portable computing devices, such as a desktop computers, consumer or business appliances, set-top devices (STDs), or other devices that have the ability to connect to RAN 120. UEs 110 may connect, through a radio link, to RAN 120. Through the radio link, UEs 110 may obtain data and/or voice services.

RAN 120 may include one or more devices that include radio interfaces to provide wireless connections to UEs 110. In one implementation, RAN 120 may include a radio access network for a cellular network, such as an LTE network.

RAN 120, as illustrated, may include one or more base stations, which, in the context of an LTE network, may be referred to as an Evolved Node B (eNodeB) 125. Each eNodeB 125 may provide a radio interface over which the eNodeB may communicate with UEs 110. The radio interfaces provided by RAN 120 may include, for example, orthogonal frequency-division multiplexing (OFDM) and/or single-carrier frequency-division multiple access (SC-FDMA) SC-FDMA based radio interfaces.

Core network 130 may include one or more networks of any type, such as a local area network (LAN), a wide area network (WAN), and/or a metropolitan area network (MAN). In one implementation, core network 130 may implement an LTE network. In this situation, core network 130 may be implemented using a flat, IP-based network architecture that includes one or more network devices or components that facilitate the providing of network access to UEs 110. Core network 130 may connect to one or more other networks, such as to the Internet, to provide network service to UEs 110.

Figure 1B:
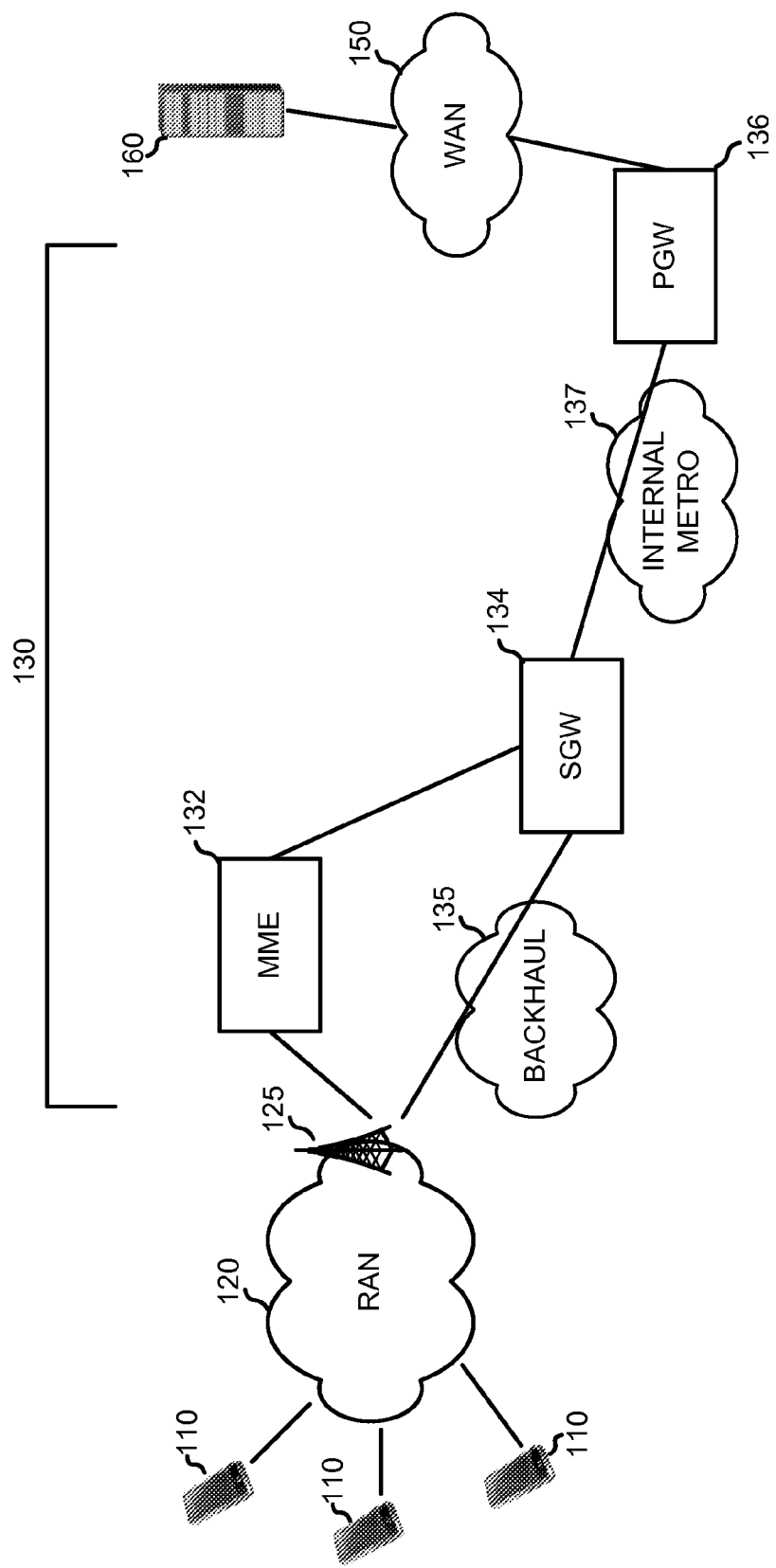
FIG. 1B is a diagram that illustrates a more detailed view of portions of the environment shown in FIG. 1A, in accordance with some implementations described herein.

FIG. 1B is a diagram that illustrates a more detailed view of portions of example environment 100. In FIG. 1B, core network 130 may be a core network implemented using LTE technologies. As shown in FIG. 1B, core network 130 may include a mobility management entity (MME) 132, a serving gateway (SGW) 134, and a packet data network gateway (PGW) 136. MME 132, SGW 134, and PGW 136 may be connected to one another, and to other devices, through one or more networks that are local to core network 130. For example, backhaul network 135, which may include an Ethernet backhaul network, may be used to connect eNodeB 125 to SGW 134. Similarly, internal metro network 137, which may include a service provider metro network or high speed optical core network, may be used to transport traffic between SGW 134 and PGW 136.

MME 132 may include one or more computation and communication devices that perform signaling for core network 130. MME 132 may, for example, be responsible for authenticating UEs 110, maintaining location information for UEs 110, and selecting a PGW 136 to service a particular UE 110. SGW 134 may include one or more computation and communication devices that route and forward user data packets. SGW 134 may also act as a mobility anchor during inter-eNodeB 125 handoffs. PGW 136 may include one or more computation and communication devices that provide connectivity from UEs 110 to external packet data networks.

As is further illustrated in FIG. 1B, PGW 136 may be coupled to a WAN 150. WAN 150 may be an external packet data network, such as the Internet or another public or private network. Servers, such as server 160, or other devices, may be connected to WAN 150.

Server 160 may include one or more computation and communication devices that provide data and/or computing services to connecting devices, such as to UEs 110. Server 160 may include, for example, a web server, a file server, or another type of server. In one implementation, when communicating with UEs 110, server 160 may use the TCP protocol. As described in more detail below, the TCP flow control mechanism used by server 160 may be optimized for transport pipes that include a segment over a radio interface, such as RAN 120.

Although server 160 is illustrated in FIG. 1B as connected to UEs 110 via PGW 136 and WAN 150, in general, the TCP flow control mechanisms described herein may be applied by devices that may be logically located in other locations.

Although FIGS. 1A and 1B illustrate example components of environment 100, in other implementations, environment 100 may contain fewer components, different components, differently arranged components, or additional components than those depicted in FIG. 1. Alternatively, or additionally, one or more components of environment 100 may perform one or more other tasks described as being performed by one or more other components of environment 100.

Figure 2:
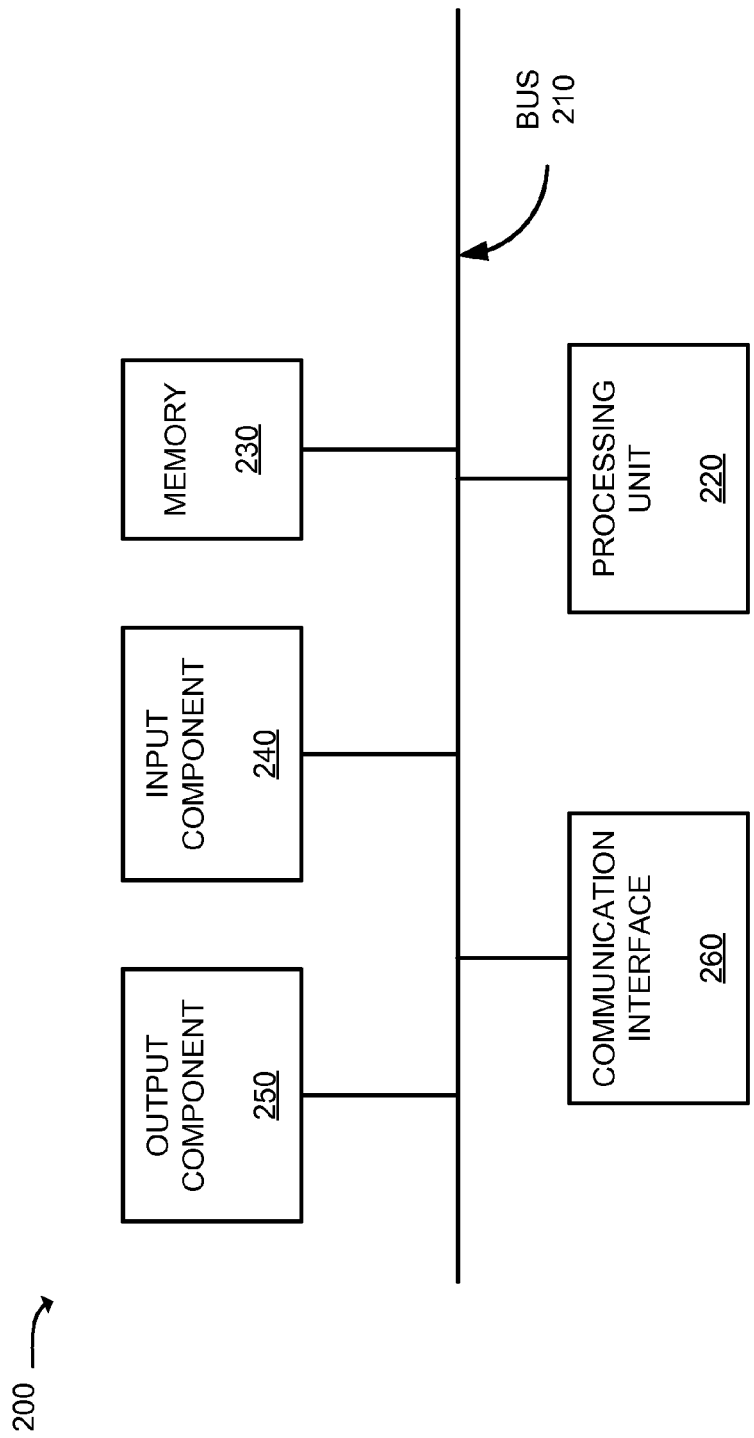
FIG. 2 is a diagram of example components of a device that may correspond to one or more devices of the environment shown in FIGS. 1A and 1B.

FIG. 2 is a diagram of example components of a device 200 that may correspond to one or more devices of environment 100, such as one or more of UEs 110, eNodeB 125, MME 132, SGE 134, PGW 136, or server 160. As illustrated in FIG. 2, device 200 may include bus 210, processing unit 220, memory 230, input component 240, output component 250, and communication interface 260.

Bus 210 may permit communication among the components of device 200. Processing unit 220 may include one or more processors (e.g., microprocessors) that interpret and execute instructions. In some implementations, processing unit 220 may be implemented as, or may include, one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a keyboard, a keypad, a mouse, a pen, a microphone, a touchscreen display, one or more biometric mechanisms, or the like. Output component 250 may include a device that outputs information, such as a display, a speaker, etc.

Communication interface 260 may include any transceiver-like mechanism that enables device 200 to communicate with other devices and/or systems (e.g., one or more devices associated with environment 100). When device 200 includes one of UEs 110 or eNodeB 125, communication interface 260 may include a radio interface, which may include antennas and/or other circuitry associated with wireless communication.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
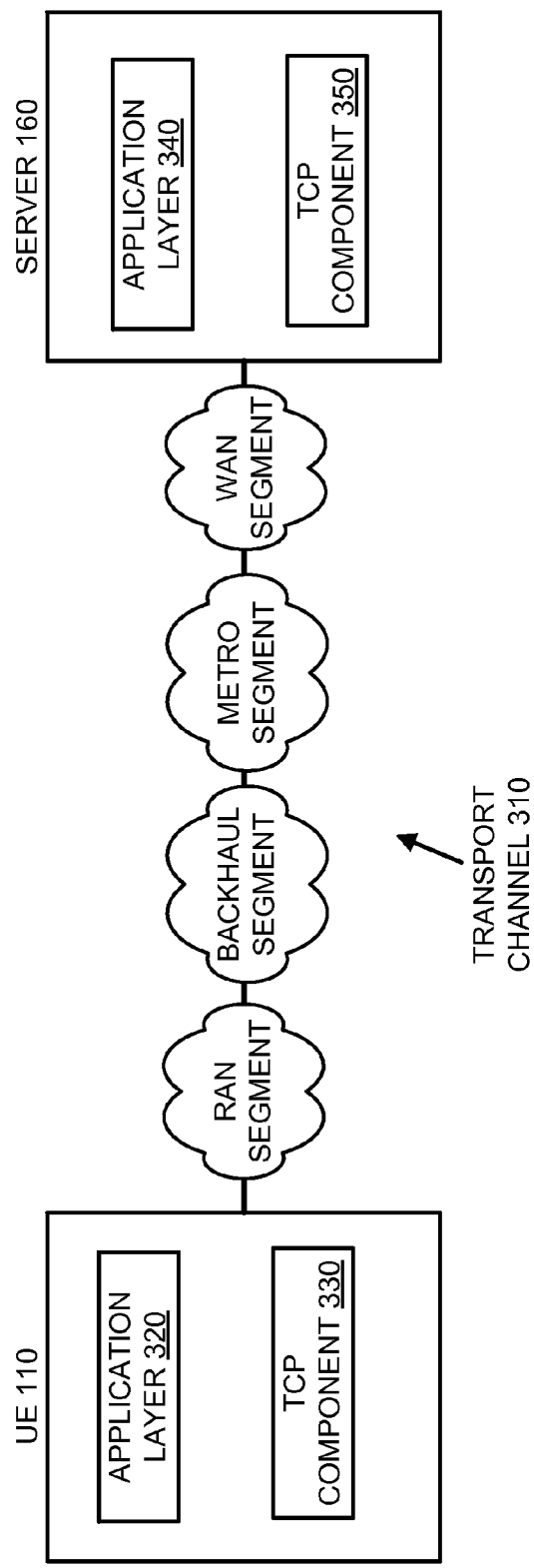
FIG. 3 is a diagram illustrating an example of functional components involved in communications performed using the TCP protocol, in accordance with some implementations described herein.

FIG. 3 is a diagram illustrating an example of functional components involved in communications, performed using the TCP protocol, in environment 100. In FIG. 3, UE 110 and server 160 are illustrated as communicating with one another, via a TCP session, over a transport channel 310. UE 110 may include application layer 320 and TCP component 330. Similarly, server 160 may include application layer 340 and TCP component 350.

Application layer 320, at UE 110, and application layer 340, at server 160, may represent one or more applications, such as applications that require network services. For example, at UE 110, application layer 320 may represent applications such as a web browser, or other program, that uses transport layer network services, such as TCP. At server 160, application layer 340 may include web server applications or other programs that use transport layer network services, such as TCP.

TCP component 330 and TCP component 350 may provide TCP services for UE 110 and server 160, respectively. During a TCP session, TCP component 330 and TCP component 350 may communicate with one another, based on the TCP protocol, to provide reliable, ordered delivery of traffic over transport channel 310.

Transport channel 310 may conceptually represent a number of different physical network segments. For example, referring to FIG. 1B, a TCP session between a UE 110 and server 160 may include a segment that traverses the radio interface ("RAN segment"), a segment that traverses backhaul network 135 ("backhaul segment"), a segment that traverses internal metro network 137 ("metro segment"), and a segment the traverses WAN 150 ("WAN segment"). The various network segments may have different properties relating to reliability and latency. The RAN segment, for example, may be particularly subject to rapid variability in the quality of the radio link. Existing congestion control mechanisms for TCP may perform poorly when dealing with rapid variability of the quality of a network segment, such as a RAN segment.

Figure 4:
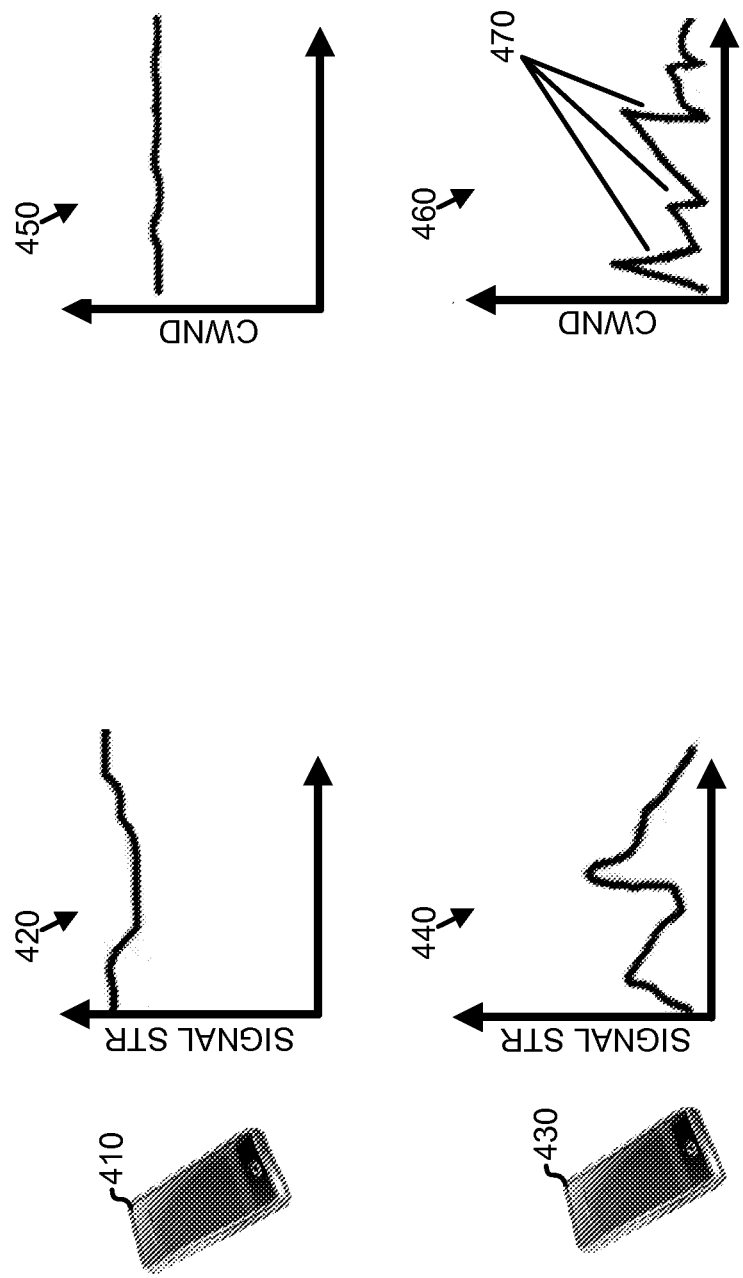
FIG. 4 is a diagram illustrating an example of the effect of varying radio signal quality on parameters relating to congestion control.

FIG. 4 is a diagram illustrating an example of the effect of varying radio signal quality on parameters relating to congestion control for existing TCP congestion control mechanisms. As illustrated, assume that a first UE, UE 410, is associated with relatively consistent radio signal strength (SIGNAL STR), illustrated by graph 420. A second UE, UE 430, may be associated with a signal having less consistent strength, illustrated by graph 440. UE 430 may be, for example, in an area with radio interference or be associated with a user that is moving through terrain that affects radio reception. In TCP, the congestion window (CWND) may refer to a parameter that is one of the factors that determines the number of bytes that can be outstanding at any time, from a TCP sender, before an acknowledgment message is received from the corresponding TCP receiver. The TCP sender may dynamically modify the congestion window based on past performance of the TCP session.

Graphs 450 and 460, plotting congestion window size versus time, for UEs 410 and 430, respectively, are additionally shown in FIG. 4. The changes in congestion window size may be based on using existing TCP congestion mechanisms. The congestion window for first UE 410 may be held at a relatively stable level. The congestion window for second UE 430, however, may vary significantly as a result of changes in the radio signal strength. For example, a number of sharp drop-offs 470, in the congestion window, are illustrated. Drop-offs 470 may negatively impact throughput of the TCP session with UE 430.

Consistent with techniques described herein, TCP flow control may use state information, describing the state of traffic queues, in eNodeB 125, when determining flow control for TCP sessions between TCP component 330, of UE 110, and TCP component 350, of server 160. Using the state information as part of flow control can potentially better optimize a TCP session for situations in which a UE 110 is connected over a RAN.

Figure 5:
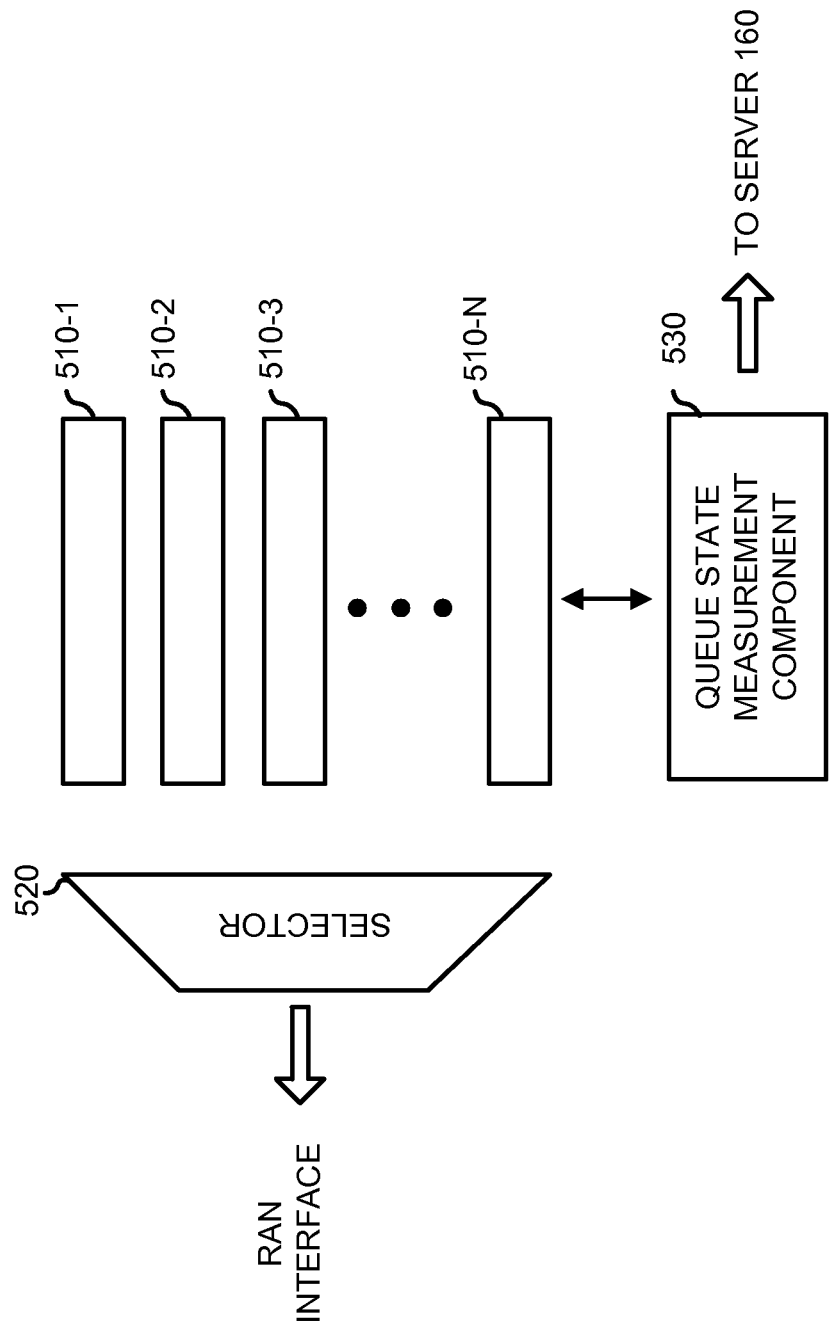
FIG. 5 is a diagram illustrating an example of functional components that may be included in an eNodeB, in accordance with some implementations described herein.

FIG. 5 is a diagram illustrating an example of functional components that may be included in eNodeB 125. As shown, eNodeB 125 may include a number of queues 510-1 through 510-N (N>=0), a selector component 520, and a queue state measurement component 530.

Each queue 510 may include a first-in first-out (FIFO) queue that is used to buffer incoming traffic, such as incoming packetized traffic, before the traffic is transmitted to the radio interface (RAN INTERFACE) of eNodeB 125. In one implementation, queues 510 may be implemented on a per-UE and/or a per-socket (e.g., per-TCP session connection) basis. In this situation, eNodeB 125 may maintain one queue 510 for each TCP session connection with a UE 110. In other implementations, the queues 510 may be assigned differently by eNodeB 125. For example, core network 130 may support multiple Quality of Service (QoS) traffic classes. In this situation, queues 510 may additionally be maintained on a per-traffic class basis.

Selector 520 may select traffic, such as packets, from queues 510, for transmission over the RAN interface. A number of selection techniques may be used by selector 520. For example, selector 520 may use a weighted round robin (WRR) technique, a weighted fair queuing (WFQ) technique, a low latency queuing (LLQ) technique, a weighted proportional fairness queuing technique, or other queuing techniques. In one example, assume that QoS parameters are set for core network 130, such that a number of differentiated QoS levels are supported (e.g., three quality of service levels may be supported). In one implementation, each TCP session, and hence each queue 510, may be associated with a QoS level. In one implementation, the selection weightings used by selector 520 may be based on the assigned QoS level. For instance, higher priority queues 510 may be assigned higher weightings than lower priority queues 510, and thus the higher priority queues 510 may be selected more often and may therefore correspond to a higher bandwidth RAN interface.

Queue state measurement component 530 may determine state information, relating to a current capacity of each of queues 510. In one implementation, each queue 510 may be associated with a high water value and a low water value, where the high water value may be a first threshold value relating to an overfilled state of the queue and the low water value may be a second threshold value relating to an underfilled state of the queue. In this implementation, queue state measurement component 530 may output, for each queue 510, a three-state value indicating whether a particular queue is under the low water value, between the low and high water values, or above the high water value. In another possible implementation, a two-state (e.g., congested or non-congested) value may be output based on the high and low water values. In another possible implementation, a single threshold value may be associated with each queue 510, and queue state measurement component 530 may output a single value indicating whether the queue is below or above the threshold.

In one implementation, different queues 510 may be associated with different threshold values. For example, queues 510, associated with different QoS classes, may be associated with different threshold values. In another possible implementation, queue state measurement component 530 may output a value, such as an integer or floating-point value, indicating the relative fullness of each queue 510. For example, a single byte value (i.e., 0-255 value) may be output by queue state measurement component 530, in which a value of zero indicates that a queue is empty and a value of 255 indicates the queue is full.

Although FIG. 5 illustrates an example of functional components that may be included in eNodeB 125, in other implementations, eNodeB 125 may contain fewer components, different components, differently arranged components, or additional components than those depicted in FIG. 5. Alternatively, or additionally, one or more components of eNodeB 125 may perform one or more other tasks described as being performed by one or more other components of eNodeB 125.

FIG. 6 is a flow chart illustrating an example process 600 for performing TCP flow control. In one implementation, process 600 may be performed by eNodeB 125. In one implementation, process 600 may be performed by one or more other devices in lieu of, or in conjunction with, eNodeB 125.

Process 600 may include maintaining traffic queues in the eNodeB (block 610). For example, as previously mentioned, queues 510 may be implemented by eNodeB 125 and may be used to buffer traffic, such as packetized traffic, before it is sent over a radio interface, associated with eNodeB 125, to UEs 110. The state of queues 510, relating to the congestion or fullness of the queues, may represent direct knowledge of the physical layer transport capacity of RAN 120. Referring to the example shown in FIG. 3, as long as there is traffic that is to be sent from server 160, via TCP component 350, to UE 110, via TCP component 330, the occupancy of a particular queue 510, which may correspond to the traffic from server 160 to UE 110, may tend to not become empty or overfilled.

Process 600 may further include transmitting the queue state information to a TCP server (block 620). For example, the queue state information may be transmitted from eNodeB 125 to TCP component 350 of server 160. TCP component 350 may use the state information to control a rate of the flow of packets, for a UE 110 corresponding to a particular queue 510, to the UE 110. In other words, the TCP congestion control mechanism, used by server 160, may be directly based on the state of queues 510. Because the chokepoint in a congested TCP session is frequently the RAN segment of the transport layer, in situations in which queue state information is received for a particular TCP session, TCP component 350 may change its congestion control objective from attempting to mitigate the overflowing of unknown buffers in the transport layer (e.g., as done with existing TCP congestion control mechanisms) to more simply not overflowing buffers (represented by queues 510) in eNodeB 125.

In one implementation, the queue state information may be proactively transmitted, by eNodeB 125, to TCP component 350 as a flow control message, such as an input/output control (IOCTL) message. Alternatively or additionally, eNodeB 125 may transmit the queue state information in response to requests from TCP component 350.

As previously mentioned, in one implementation, the state information for each queue may be a binary indication of whether the queue is congested or not congested. The binary indication may be obtained by comparing a fullness level of each queue to a threshold value (or a pair of threshold values) corresponding to the queue. A matrix, or other data structure, containing the binary values for all of the queues, maintained by eNodeB 125, may be transmitted by eNodeB 125, as the queue state information, to TCP component 350. The binary value for any particular queue may be looked up by TCP component 350, in the matrix, based on a hash operation applied to identification information relating to the TCP session, such as the address and/or port values of the network socket corresponding to the TCP session. The binary values for the matrix may be transmitted by eNodeB 125, to TCP component 350, as a block operation in which the entire matrix is transmitted and/or individual values within the matrix may be periodically or occasionally updated and individually transmitted.

FIG. 7 is a flow chart illustrating an example process 700 for performing TCP flow control. In one implementation, process 700 may be performed by a device transmitting data, via TCP, to another device. For example, process 700 may be performed by TCP component 350 of server 160.

Process 700 may include receiving the queue state information (block 720). For example, server 160 may receive the queue state information from eNodeB 125.

Packets, that are to be transmitted, for each of the TCP sessions that are being handled by server 160, may potentially be transmitted using the queue state information. In some implementations, the queue state information may only apply to certain TCP sessions, such as those TCP sessions with UEs 110 that are connected to eNodeBs 125 that transmit the queue state information to server 160.

For each TCP session, process 700 may further include determining whether the TCP session is covered by the queue state information (block 715). In one implementation, and as previously discussed, the queue state information may be included in a matrix that is indexed by a hash value generated based on parameters relating to a TCP session. The determination of whether the TCP session is covered by the queue state information may be based on a determination of whether the hash value can be used to successfully index the matrix.

Process 700 may further include, when the TCP session is determined to be covered by the queue state information (block 715—YES), transmitting packets, via TCP, in which packet flow control is based on the received queue state information (block 720). In one implementation, the queue state information may be used to directly make decisions as to whether a packet, corresponding to a particular TCP session, should be transmitted or held. For example, if the queue state information indicates that the queue, corresponding to a particular UE 110, is full, TCP component 350 may refrain from sending packets to the particular UE 110.

In other implementations, other techniques may be used to perform packet flow control based on the received queue state information. For example, existing TCP congestion mechanisms may be modified to take into account the queue state information. One TCP congestion mechanism may use a congestion window size parameter to determine a quantity of packets that can be sent before an acknowledgment is received back. In one implementation, the congestion window size parameter may be modified, at least in part, based on the queue state information. For example, as a particular queue becomes full, the value for the corresponding congestion window size may be reduced, which may tend to decrease the bandwidth used by the TCP session.

Process 700 may further include, when the TCP session is determined to not be covered by the queue state information (block 715—NO), using existing TCP congestion mechanisms to perform flow control for the TCP session (block 730). This may correspond to the situation in which a UE is not connected via a cellular wireless network, such as a UE that is connected to server 160 via a wired connection, a WiFi connection, or through an eNodeB that has not sent queue state information to server 160.

Figure 8:
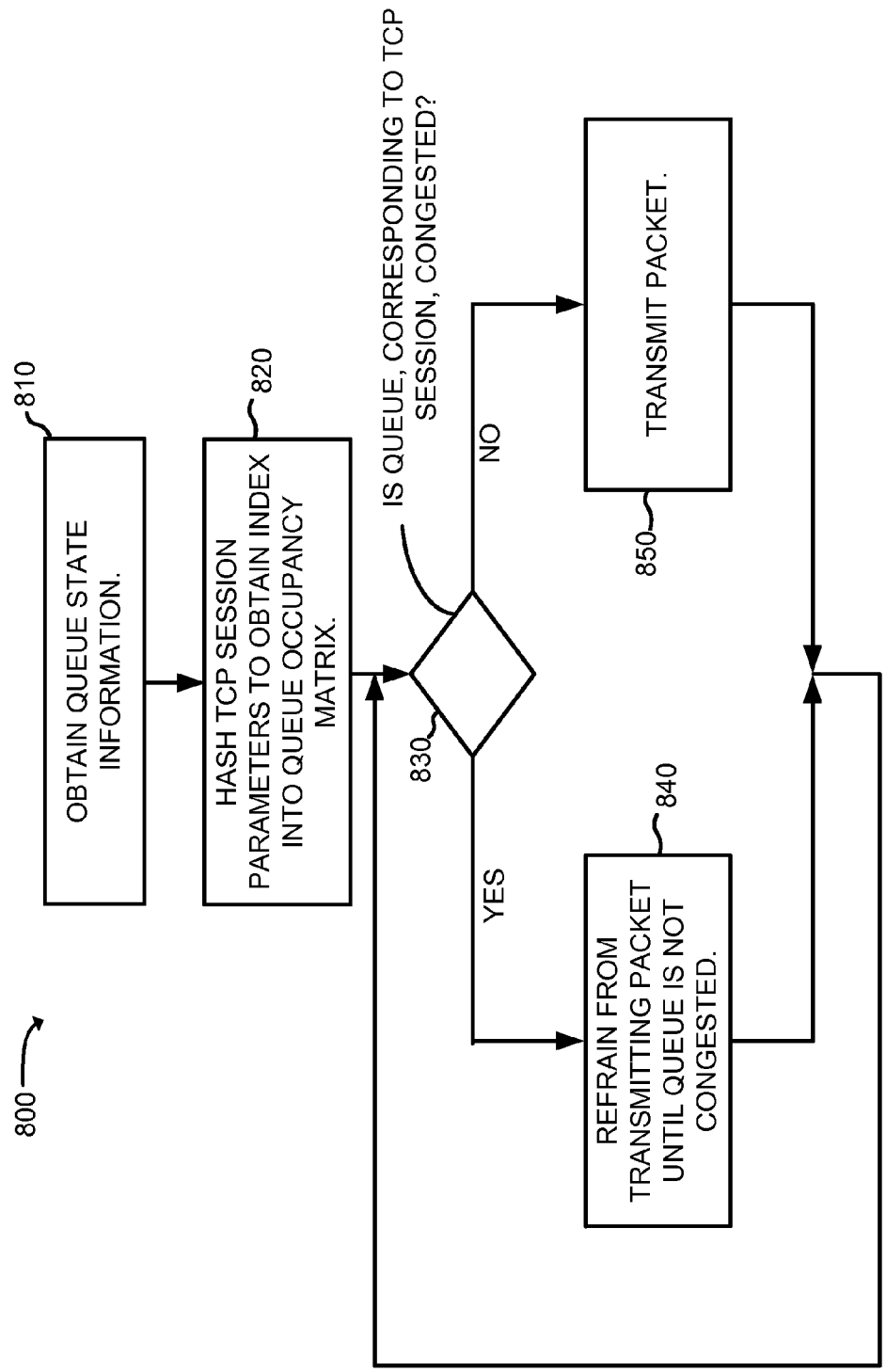

FIG. 8 is a flow chart illustrating an example process 800 for performing TCP flow control. Process 800 may represent one possible implementation of the flow control performed in block 720. In one implementation, process 800 may be performed by TCP component 350 of server 160.

Process 800 may include receiving the queue state information (block 810). In one implementation, the queue state information may include a queue occupancy matrix. Each entry in the matrix may represent a congested or non-congested state of a particular queue 510. In one implementation, server 160 may receive the queue occupancy matrix from eNodeB 125.

In one implementation, each value in the queue occupancy matrix may be indexed by a value that is based on one or more TCP session parameters (e.g., a value that is a result of a hashing function performed on values associated with TCP session parameters). For example, each TCP session may be associated with logical socket defined by one or more IP addresses and/or port numbers. Process 800 may further include hashing the TCP session parameters to obtain an index into the queue occupancy matrix (block 820). The hashed index may be used to quickly and/or efficiently obtain the value in the queue occupancy matrix that corresponds to the TCP session.

Process 800 may further include determining whether the queue, corresponding to the TCP session, is congested (block 830). In one implementation, the hash value obtained in block 820 may be used to lookup, in the queue occupancy matrix, whether the queue for the TCP session is congested. When the queue is congested (block 830—YES), process 800 may further include refraining from transmitting the packet until the queue is not congested (block 840). When, however, the queue is congested (block 830—NO), process 800 may further include transmitting the packet to UE 110 using TCP (block 850). Blocks 830-850 may be repeated for each packet in the TCP session.

With the flow control performed as illustrated in FIG. 8, TCP component 350 may perform flow control for a TCP session based directly on the state of packet scheduling queues in the eNodeB. This may lead to improved flow control and congestion management, as a congestion state can be directly determined on a per-TCP session and per-QoS basis. Further, the flow control techniques described herein may automatically account for QoS settings in core network 130, as higher priority queues will tend to empty faster than lower priority queues, which will be reflected in the queue state information provided to TCP component 350.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
receiving, by a device and from a base station in a cellular network, information defining a congestion state of queues at the base station, the queues being used to perform buffering for a radio interface in the cellular network, wherein the information defining the congestion state includes a plurality of binary values, wherein each of the plurality of binary values indicates whether a particular one of the queues is congested, and wherein receiving the information further comprises:
calculating a hash value based on parameters relating to a Transmission Control Protocol (TCP) session; and
looking up a particular one of the plurality of binary values based on the calculated hash values,
performing flow control, by the device and for the TCP session, based on the information defining the congestion state and based on the particular one of the plurality of binary values; and
transmitting, by the device, data, based on the performed flow control, to user equipment (UE) connected to the cellular network, the data being transmitted via the TCP session.

2. The method of claim 1, wherein performing the flow control further includes:
transmitting the data, via the TCP session and to the UE, when the particular one of the plurality of binary values indicates that the particular one of the queues is not congested; and
refraining from transmitting the data, over the TCP session and to the UE, when the particular one of the plurality of binary values indicates that the particular one of the queues is congested.

3. The method of claim 1, wherein the parameters relating to the TCP session include address and port values.

4. The method of claim 1, wherein performing the flow control further includes:
modifying TCP congestion control parameters based on the information defining the congestion state.

5. The method of claim 1, wherein the cellular network includes a Long Term Evolution (LTE) network, and wherein the base station includes an Evolved Node B (eNodeB).

6. A device comprising:
a memory; and
at least one processor to:
receive, from a base station in a cellular network, information defining a congestion state of queues at the base station, the queues being used to perform buffering for a radio interface in the cellular network, wherein the information defining the congestion state includes a plurality of binary values, wherein each of the plurality of binary values indicates whether a particular one of the queues is congested;
calculate a hash value based on parameters relating to a Transmission Control Protocol (TCP) session;
look up a particular one of the plurality of binary values based on the calculated hash values;
perform flow control, for the TCP session, based on the information defining the congestion state and based on the particular one of the plurality of binary values; and
transmit data, based on the performed flow control, to user equipment (UE) connected to the cellular network, the data being transmitted via the TCP session.

7. The device of claim 6, wherein the at least one processor is further to:
transmit the data, via the TCP session and to the UE, when the particular one of the plurality of binary values indicates that the particular one of the queues is not congested; and refrain from transmitting the data, over the TCP session and to the UE, when the particular one of the plurality of binary values indicates that the particular one of the queues is congested.

8. The device of claim 6, wherein the parameters relating to the TCP session include address and port values.

9. The device of claim 6, wherein the at least one processor is further to:
modify TCP congestion control parameters based on the information defining the congestion state.

10. The device of claim 6, wherein the cellular network is a Long Term Evolution (LTE) network and the base station includes a Evolved Node B (eNodeB).

11. A device comprising:
a radio interface to connect to one or more user equipment (UE) devices in a Long Term Evolution (LTE) network;
a plurality of queues to buffer data, incoming to the device, from one or more servers via one or more Transmission Control Protocol (TCP) sessions, the data being destined for the one or more UE devices via the radio interface;
one or more processors to:
determine state information relating to a fullness level of the plurality of queues, the state information including a plurality of values, in which each of the plurality of values indicates whether a particular one of the plurality of queues is congested; and
transmit the state information to the one or more servers for use by the one or more servers in performing flow control with respect to the TCP sessions.

12. The device of claim 11, wherein the one or more processors are further to:
determine the state information based on a comparison of the fullness level, corresponding to each of the plurality of the queues, to first and second threshold values.

13. The device of claim 11, wherein the device includes an eNodeB.

14. The device of claim 11, wherein each of the plurality of values includes a binary indication of whether a corresponding queue is congested.

15. The device of claim 11, wherein, when transmitting the state information, the one or more processors are further to:
transmit the state information as an input/output flow control (IOCTL) message.

16. A method comprising:
receiving, by a base station in a Long Term Evolution (LTE) network and via one or more Transmission Control Protocol (TCP) sessions, data from one or more servers, the data being destined for one or more user equipment (UE) devices associated with the Long Term Evolution (LTE) network;
buffering, by the base station, the received data in a plurality of queues, before transmitting the received data via a radio interface associated with the base station;
determining, by the base station, state information relating to a fullness level of each of the plurality of queues, the state information including a plurality of values, wherein each of the plurality of values indicates whether a particular one of the plurality of queues is congested; and
transmitting, by the base station, the state information to the one or more servers for use by the one or more servers in performing flow control with respect to the TCP sessions.

17. The method of claim 16, wherein the base station includes an eNodeB.

18. The method of claim 16, further comprising:
determining the state information based on a comparison of the fullness level, corresponding to each of the plurality of the queues, to first and second threshold values.

19. The method of claim 16, further comprising:
determining the state information based on a comparison of the fullness level, corresponding to each of the plurality of the queues, to a first threshold value.

20. The method of claim 16, wherein each of the plurality of values includes a binary indication of whether a corresponding queue is congested.

21. The method of claim 16, wherein transmitting the state information further includes:
transmitting the state information as an input/output flow control (IOCTL) message.

* * * * *